United States Patent [19]

Knapp

[11] 4,373,491
[45] Feb. 15, 1983

[54] FUEL SUPPLY SYSTEM

[75] Inventor: Heinrich Knapp, Leonberg, Fed. Rep. of Germany

[73] Assignee: Robert Bosch GmbH, Stuttgart, Fed. Rep. of Germany

[21] Appl. No.: 265,758

[22] Filed: May 21, 1981

[30] Foreign Application Priority Data

May 22, 1980 [DE] Fed. Rep. of Germany ....... 3019544

[51] Int. Cl.³ .............................................. F02M 61/14
[52] U.S. Cl. ..................................... 123/472; 123/585
[58] Field of Search ............................... 123/472, 478; 261/DIG. 39; 239/585

[56] References Cited

U.S. PATENT DOCUMENTS 4,149,496  4/1979  Palma .............................. 123/472 X

FOREIGN PATENT DOCUMENTS 134223  10/1979  Japan .................................... 123/478

Primary Examiner—William A. Guchlinski, Jr.

Attorney, Agent, or Firm—Edwin E. Greigg

[57] ABSTRACT

A fuel supply system is proposed for mixture-compressing internal combustion engines having externally supplied ignition. The fuel supply system includes an air intake tube delimited by an air filter, the air intake tube having a conical section downstream of which an arbitrarily actuatable throttle device is disposed. Associated with the conical section of the air intake tube is an air bypass line in which an air flow rate meter provided with a temperature-dependent resistor is disposed. The quantity aspirated by the engine is determined by this air flow rate meter. A fuel injection valve is disposed in such a manner that on one side it protrudes into the interior of the air filter and on the other side, with a slender mouthpiece, it protrudes approximately through the conical section. The fuel can be injected into the gap between the throttle device and the air intake tube wall by means of this mouthpiece. The fuel supply system according to the invention has a very low structural height.

4 Claims, 1 Drawing Figure

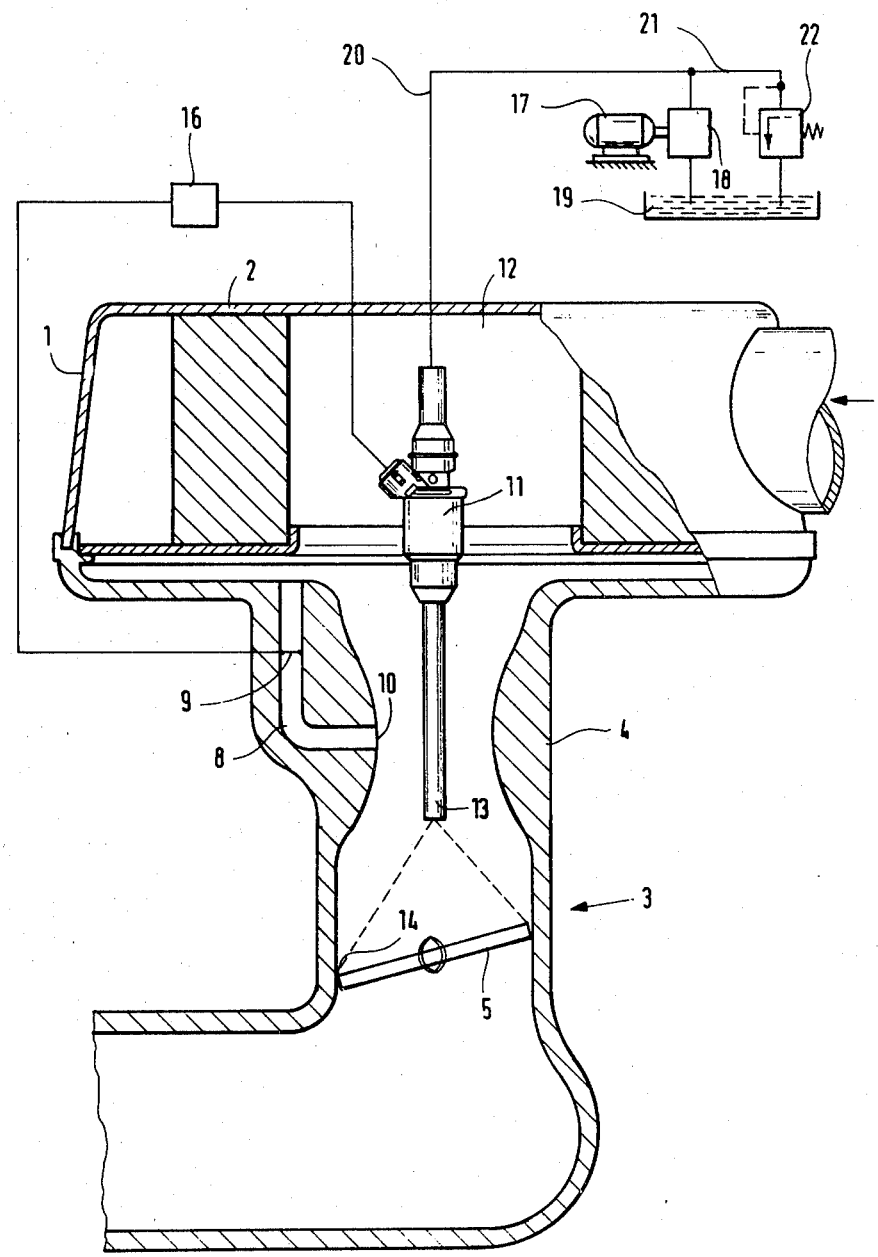

FUEL SUPPLY SYSTEM

BACKGROUND OF THE INVENTION

The invention is based on a fuel supply system for internal engines. A fuel supply system is already known which requires great structural height, because the air flow rate meter, as well as the Venturi-shaped portion of the air intake tube and the throttle device are disposed in series one above the other.

OBJECT AND SUMMARY OF THE INVENTION

The fuel supply system according to the invention has the advantage over the prior art that a fuel supply system having the shortest possible structural height is created while maintaining the known carburetor intake tube. With this fuel supply system, the supply of fuel for the internal combustion engine is effected into the intake tube centrally, upstream of the throttle device.

As a result of the characteristics disclosed herein, advantageous modifications of and improvements to the fuel supply system disclosed are possible.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows one exemplary embodiment of the invention in simplified fashion.

DESCRIPTION OF THE PREFERRED EMBODIMENT

In the exemplary embodiment shown in the drawing, the combustion air flows in the direction of the arrow through an annular air filter tube disposed in a housing 1 and into an air intake tube 3, which leads to one or more cylinders, not shown, of a mixture-compressing internal combustion engine with externally supplied ignition. The air intake tube 3, in the immediate vicinity of the filter, has a conical section 4, in particular a section having the form of a Venturi tube. Downstream of this section 4, there is an arbitrarily actuatable throttle device embodied as a throttle valve 5. A temperature-dependent resistor 9 which serves to ascertain the air mass aspirated by the engine is disposed in an air bypass line 8 which bypasses the Venturi-like section 4 of the air intake tube 3. The temperature and resistance value of this temperature-dependent resistor 9 is regulated in accordance with the quantity of air aspirated by the engine. An air flow measurement of this kind is known, being provided by hot wires or hot films which are part of a bridge circuit. Upstream of the narrowest cross section 10 of the Venturi-like section 4, the air bypass line 8 branches off from the air intake tube 3 and discharges into the air intake tube 3 in the vicinity of the narrowest cross section 10 of the Venturi-like section 4. A fuel injection valve 11 is disposed upstream of the Venturi-like section 4 of the air intake tube 3 in such a fashion that it protrudes with its magnetic element substantially into the cavity 12 of the annular air filter 2, while slender mouthpiece 13 protrudes at least approximately all the way through the Venturi-like section 4, by way of which the fuel can be injected, preferably with a spherical stream, into the gap 14 between the throttle valve 5 and the air intake tube wall 3. The electromagnetically actuatable fuel injection valve 11 is triggered in a known manner via an electronic control device 16, in accordance with the quantity of air aspirated by the engine, which is ascertained by way of example by the air flow rate meter 9. The supply of fuel to the fuel injection valve 11 is effected by way of example by means of a fuel pump 18 driven by an electromotor 17. The fuel pump 18 aspirates fuel from a fuel container 19 and delivers it to the fuel injection valve 11 via a fuel supply line 20. A line 21 in which a pressure regulating valve 22 is disposed branches off from the fuel supply line 20, and fuel can flow back to the fuel container by way of this line 21.

The described embodiment of a fuel supply system permits the use of a known carburetor-intake tube, and because of the disposition of the air flow rate meter 9 in the air bypass line 8 and the partial disposition of the fuel injection valve 11 in the vicinity of the air filter 2, it has the advantage of very low structural height. This permits it to be disposed even in a very restricted engine compartment of a motor vehicle.

The foregoing relates to a preferred exemplary embodiment of the invention, being understood that other embodiments and variants thereof are possible within the spirit and scope of the invention, the latter being defined by the appended claims.

What is claimed and desired to be secured by Letters Patent of the United States is:

1. A fuel supply system for mixture-compressing internal combustion engines with externally supplied ignition comprising an air intake tube, an air filter positioned relative to said air intake tube, said air intake tube having a venturi-like section, an arbitrarily actuatable throttle device in said intake tube downstream of said venturi-like section, a fuel injection valve upstream of said throttle device for injecting toward said throttle valve a quantity of fuel corresponding to the quantity of air aspirated by the engine, an air bypass line connected to said venturi-like section of said air intake tube, an air flow rate meter in said air bypass line and further that said injection valve includes a portion arranged to protrude into said air filter upstream of said venturi-like section, and said injection valve comprises a slender mouthpiece which extends through said venturi-like section so that fuel can be ejected upstream of said throttle device downstream of said venturi-like section.

2. A fuel supply system as defined by claim 1, characterized in that a temperature-dependent resistor serves as the air flow rate meter, the temperature and resistance value thereof being regulated in accordance with the aspirated quantity of air.

3. A fuel supply system as defined by claim 2, characterized in that said throttle device has a periphery which can be brought into a point of contact with paid intake tube and fuel can be injected toward said point of contact.

4. A fuel supply system as defined by claim 3, characterized in that said injection valve is electromagnetically actuable.

* * * * *